F. G. BUTLER.
Milk-Cooler.

No. 228,602. Patented June 8, 1880.

WITNESSES:
Francis McArdle
Edw. W. Byrn

INVENTOR:
F. G. Butler
BY
ATTORNEYS.

2 Sheets—Sheet 2.
F. G. BUTLER.
Milk-Cooler.
No. 228,602. Patented June 8, 1880.
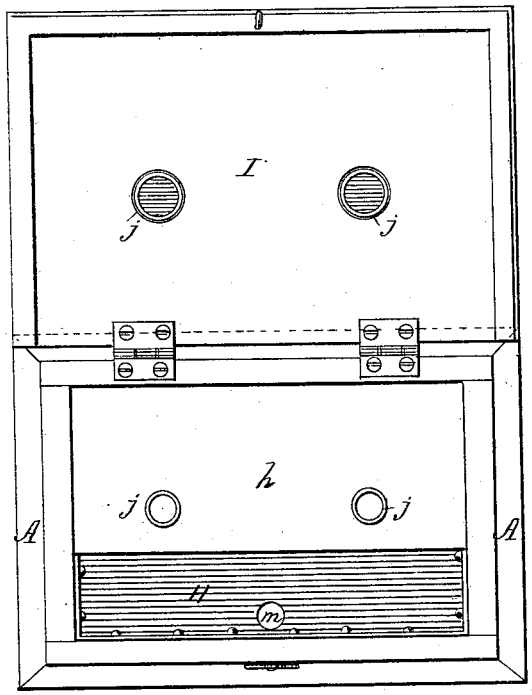
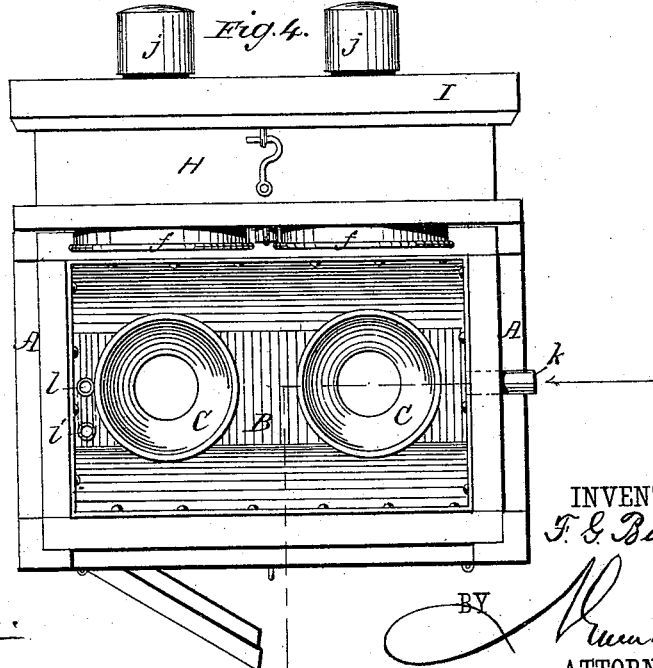

UNITED STATES PATENT OFFICE.

FRANCIS G. BUTLER, OF BELLOWS FALLS, VERMONT, ASSIGNOR TO VERMONT FARM MACHINE COMPANY, OF SAME PLACE.

MILK-COOLER.

SPECIFICATION forming part of Letters Patent No. 228,602, dated June 8, 1880.

Application filed September 1, 1879.

*To all whom it may concern:*

Be it known that I, FRANCIS G. BUTLER, of Bellows Falls, in the county of Windham and State of Vermont, have invented a new and Improved Milk-Cooler; and I do hereby declare that the following is a full, clear, and exact description of the same, reference being had to the accompanying drawings, forming part of this specification, in which—

Figure 1:
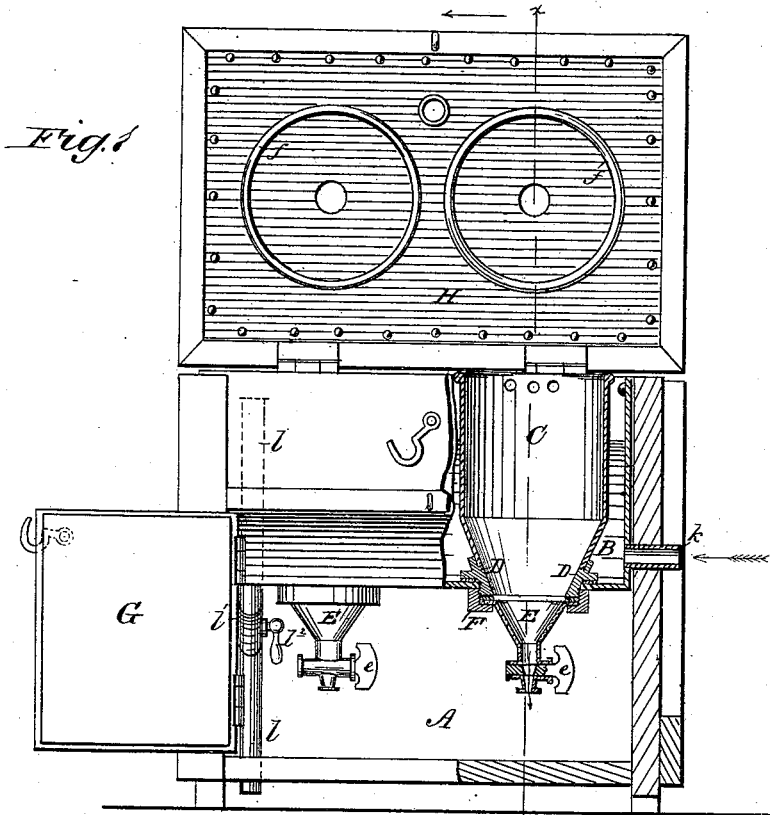
Figures 6, 7:
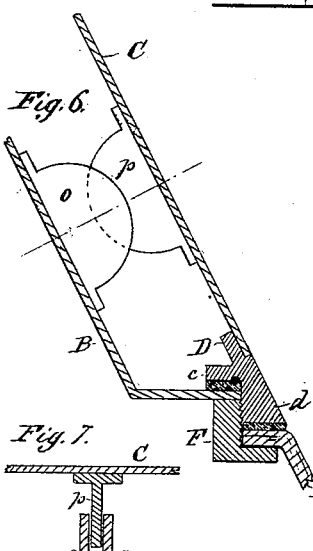
Figure 2:
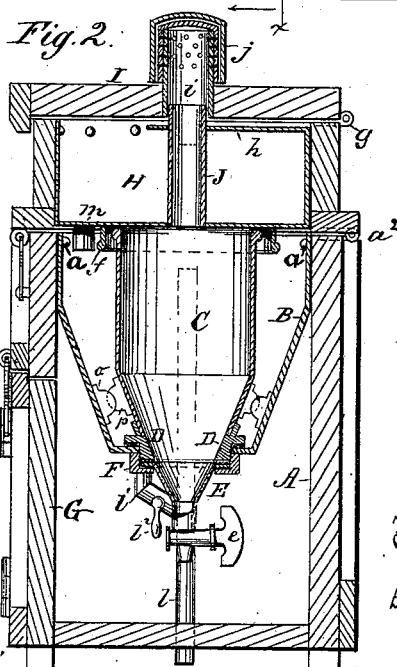
Figure 5:
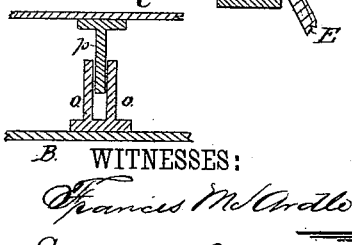

Figure 1 is a front elevation, with the doors open, the cover raised, and one side of the case broken away, showing in section the milk-can and its connections to the water-tank. Fig. 2 is a transverse vertical section through line $x\ x$ of Fig. 1. Fig. 3 is a plan view with the lid of the hollow cover thrown back. Fig. 4 is a plan view with the hollow cover thrown back. Fig. 5 is an enlarged sectional detail of the joint between the can, the funnel, and the water-tank. Figs. 6 and 7 are respectively a side and sectional view of the lugs for holding and bracing the milk-can in the water-tank.

My invention relates to certain improvements in milk-coolers, designed to render these devices more complete and effective, and to permit a more convenient and economic management of the same.

The milk-cooler is constructed, generally, of an inclosing-case of wood having a hinged top, a water-tank for containing the cooling-liquid, and a can for the milk immersed in the water of the tank, which can partakes of that form which has a conical bottom, through which the milk is drawn off.

The novel features of my invention consist, first, in the combination, with a milk-can, of a separable transparent funnel arranged to form the bottom of said can; secondly, in constructing the can with a tapering bottom and combining the detachable funnel therewith, so that its sides constitute a prolongation of the tapering walls of the can and contribute to the holding capacity of the can; thirdly, in combining the can as thus constructed with a water-tank having tapering side walls and a flat bottom, with openings in said bottom, through which a portion of the can projects, or upon the outside of which opening the detachable glass funnel is attached to complete the inclosure of the can.

The invention also consists in other minor features of construction, hereinafter fully described, and pointed out in the claims.

In the drawings, A represents the outer case of the milk-cooler, which is constructed of wood or other non-conductor in a rectangular upright form. To the upper edge of this case is attached, at $a$, the pendent sheet-metal water-tank B, between whose walls and the sides of the case a proper air-space or suitable non-conducting packing should be interposed. The front and rear walls of the tank descend in a converging or tapering manner, so as to form a narrowing or trough-shaped bottom to the said tank. In this water-tank are sustained the milk-cans C, which, for the most part, are of a cylindrical shape, but at their lower ends converge or taper, so that these walls are more or less parallel with the converging front and rear walls of the tank. These cans extend from a point flush with the edge of the water-tank at the top to the bottom of the latter, and have each an open bottom, which registers with a corresponding opening in the bottom of the water-tank. To the lower portion of this can is rigidly attached a brass or other metal ring, D, (see Figs. 5 and 6,) which is formed with a shoulder, $c$, that rests upon a packing-ring on the re-enforced circular edge of the tank, while its lower portion, $d$, projects below the bottom of the tank, and is screw-threaded. Abutting against the lower edge of ring D, and fitting water-tight against the same by reason of a gasket, is the exterior funnel E, having stop-cock $e$, which funnel is arranged so that its walls form a continuation of the converging walls of the can. This funnel is flanged at its upper edge, and encircling and inclosing this flange is a swiveling screw-collar, F, which is screw-threaded, so as to fit over the dipping-thread of the ring D, so that when screwed up tightly funnel E is connected with the can, so as to form practically the bottom of the same, which action at the same time connects the can and funnel to the water-tank with a water-tight joint, which prevents the water or refrigerating-liquid which is around the exterior of the can from running out into the lower portion of the case.

For holding the cans against turning, and for bracing the same in the water-tank, I form upon each side of the water-tank lugs o o, Figs. 2, 6, and 7, and affix to the can a lug, p, which, when slipped between lugs o o, secures the desired effect.

In constructing the detachable funnel E, I use glass, which is extremely advantageous for the following reasons: In the first place, when the milk is to be skimmed it permits the operation to be quickly and economically effected, for the milk is simply drawn off until the line of cream appears at the transparent funnel, when a different receptacle is placed beneath the discharge-pipe to catch it. In the second place, it concentrates the sedimentary impurities of the milk in a single place, which is directly at the discharge-orifice, instead of allowing them to be distributed over the bottom of the pan, and the said funnel being transparent, it allows the said impurities, as collected in bulk in the funnel, to be seen and turned off without loss of more than a few spoonfuls of the milk.

Now, I am aware that a milk-can has been provided with a permanent tapering bottom and stop-cock, and that such tapering bottom has been provided with a transparent window; and, furthermore, that a milk-can has been made to open through the bottom of a water-tank through a glass pipe for observing the cream-level; but in such cases the joints of the tube and the seams for holding the glass window give lodgment to dirt and impurities, the cream-line is not so easily discerned, and the different rate of expansion between the metal and glass is liable to open cracks about the window and permit leakage. These objections are all obviated by my glass funnel, and a smooth clean course for the milk and impurities is provided, while the funnel, by contributing to the capacity of the can, gives room for the accumulation of all sediment and the opportunity to observe its complete discharge without wasting milk, as would be the case when the impurities find lodgment upon the more or less horizontal bottom of a can.

In further defining this feature of my invention, I would state that I am aware that a receptacle for rendering fats has been constructed with a conical bottom having a glass tube at the lower end. My invention is distinguished from this in the following respects: First, that the tube and cone of the funnel in my case are made homogeneous, of glass, without a joint between the tube and the point where the cone commences to diverge, and hence the tube and cone part of the fragile glass funnel are more strongly connected and better able to resist fracture at this point, while the peripheral abutment of the upper edge of the funnel makes a stronger connection for fastening glass to metal, and are better able to resist lateral strain. The seam or joint is also removed from the narrow and contracted discharge and greater facility for cleaning afforded.

In constructing the front and back walls of the water-tank they are tapered inwardly, as before stated. The object of this is twofold in a can discharging at the bottom, for the reason, first, that as access is to be had to the lower end of the case through the doors G, this incline permits the line of vision of the operator to be unobstructed, and he can therefore both see the funnel and its connection and manipulate the same without getting down upon his hands and knees. In the second place, this incline reduces the bulk of cold water or refrigerating-liquid at the bottom, which bulk may be reduced at the bottom without prejudice, for the reason that the greatest cold is at this point.

H is the hollow hinged and refrigerating cover, which is lined with sheet metal, and is designed to contain ice or a flow of cold water to keep the upper portion of the can down to the proper temperature. This cover is hinged at $a^2$ to the outer case, and when folded down closes the top of the water-tank, while a circular pendent skirt, f, at the same time fits over and covers the top of each individual can. To give access to the interior of this refrigerating-cover it has itself an individual lid, I, hinged at g. In turning the hollow cover H back it will be seen that if it be filled with loose ice or water its contents would be spilled out. To obviate this the sheet-metal lining of the cover is permanently extended nearly across the top of the cover from the hinged side, as at h, and this, when the cover H is raised, forms a pocket that retains the contents of the cover independently of lid I.

As it is desirable to have the interior of the milk-can well ventilated, I have arranged in the hollow cover H a tube, J, opening at its lower end into the milk-can and passing upwardly through the extension h, which latter not only performs the function of retaining the ice when the cover is raised, but also serves to hold and brace the tube J at the top. This tube J has an upper detachable section fixed in the lid I. This upper section, it will be seen, terminates in a perforated cap, i, which, when occasion requires it, may be covered by a second imperforate cap, j, to cut off the ventilation.

When the milk is to be cooled by a constant flow of water it is admitted through pipe k, and is maintained at a constant level by overflow-pipe l, which rises in the tank to the desired water-level.

For drawing off the water entirely from the tank a branch pipe, l', and stop-cock $l^2$ are provided, which branch pipe opens through the bottom of the tank upon a level with said bottom and drains the water therefrom into the pipe l.

For carrying off the drip from the ice in hollow cover H a pipe, m, leads the same into the water-tank below.

Having thus described my invention, what I claim as new is—

1. The combination, with a milk-can, of a separable transparent funnel, arranged, as described, to form the bottom of the can, as and for the purpose set forth.

2. A milk-can having a conical or tapering bottom, with its lower conical portion made of glass and separable from the upper conical portion, as described.

3. A milk-can having a conical or tapering bottom, with its lower conical portion made of glass and separable from the upper conical portion, in combination with a water-tank for containing the same, having a flat bottom, with openings therethrough to receive the cans, and tapering side walls, substantially as and for the purpose described.

4. The combination, in a milk-cooler, of a water-tank having an opening in the bottom, a milk-can having a tapering lower end and open bottom registering with the opening in the bottom of the water-tank, a detachable funnel made of glass and having its walls straight with or a prolongation of the tapering lower end of the milk-can, and provided with stop-cock arranged beneath the tank, and a coupling for connecting the funnel to the can and the can to the tank, substantially as and for the purpose set forth.

5. The hollow refrigerating-cover H, having a ventilating-tube, J, extending through the same, and having also an extension, $h$, for bracing said tube at its upper end and holding the refrigerating materials when the cover is thrown back on its hinges.

6. The hinged hollow cover H, having a ventilating-tube extending through the same, in combination with a hinged lid, I, having a perforated cap fitting over said tube, substantially as described.

The above specification of my invention signed by me this 29th day of August, A. D. 1879.

FRANCIS G. BUTLER.

Witnesses:
EDWD. W. BYRN,
SOLON C. KEMON.